No. 871,757. PATENTED NOV. 19, 1907.
A. L. GREENLAW.
FLEXIBLE PIPE JOINT.
APPLICATION FILED APR. 16, 1906.
2 SHEETS—SHEET 1.
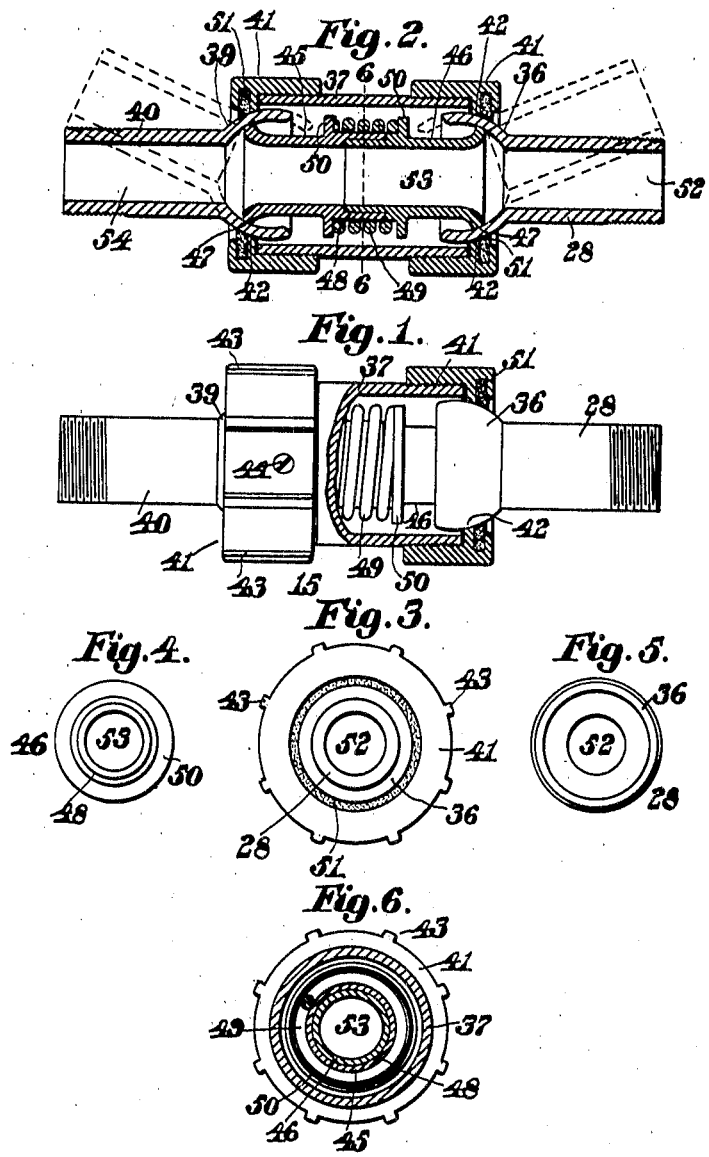
Witnesses:
Robert Ball Eales
Edna C Cleveland
Inventor:
Arthur L. Greenlaw,
by Walter E. Lombard,
Atty.

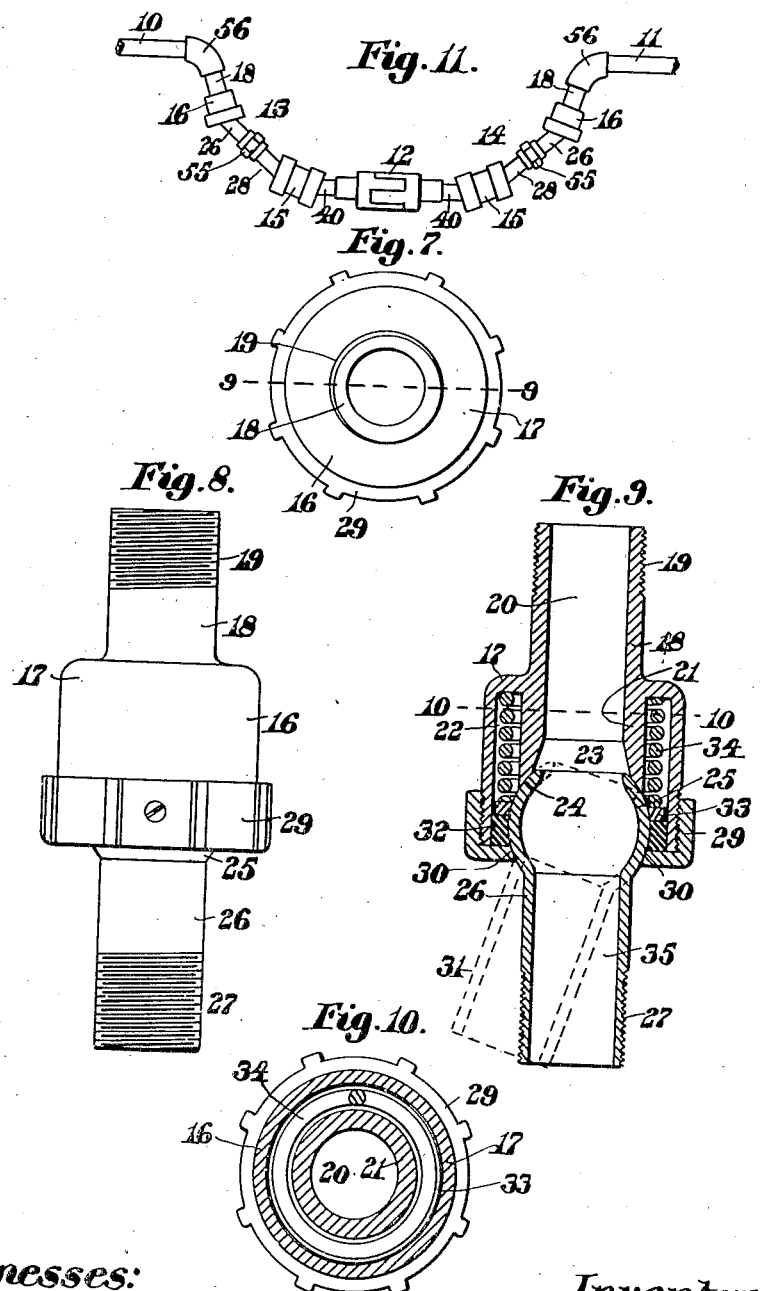

UNITED STATES PATENT OFFICE.

ARTHUR L. GREENLAW, OF MALDEN, MASSACHUSETTS, ASSIGNOR OF ONE-HALF TO WESLEY W. BLAIR, OF NEWTONVILLE, MASSACHUSETTS.

FLEXIBLE PIPE-JOINT.

No. 871,757.  Specification of Letters Patent.  Patented Nov. 19, 1907.

Application filed April 16, 1906. Serial No. 311,854.

*To all whom it may concern:*

Be it known that I, ARTHUR L. GREENLAW, a citizen of the United States of America, and a resident of Malden, in the county of Middlesex and State of Massachusetts, have invented certain new and useful Improvements in Flexible Pipe-Joints, of which the following is a specification.

The use of a flexible hose to make the connections between the train pipes of two cars or between a car and the locomotive has been found to be objectionable and in many cases metal pipes have been substituted therefor. Where the latter are used, however, it is obvious that it is advantageous to secure the greatest flexibility of said pipe to provide for vibrations of the cars in all directions.

To accomplish this object and provide a pipe connection of great flexibility which may readily be disconnected at a single point is the object of the present invention which consists in certain novel features of construction and arrangement of parts which will be readily understood by reference to the description of the drawings and to the claims to be hereinafter given.

Of the drawings: Figure 1 represents a plan partly in section of a double joint used in making the connection. Fig. 2 represents a longitudinal section of the same. Fig. 3 represents an end view of the same. Fig. 4 represents an end view of one of the tubular connectors. Fig. 5 represents an end view of the ball-shaped ends. Fig. 6 represents a section on line 6—6 on Fig. 2. Fig. 7 represents a plan of a single joint used in making the connection. Fig. 8 represents an elevation of the same. Fig. 9 represents a vertical section on line 9—9 on Fig. 7. Fig. 10 represents a horizontal section on line 10—10 on Fig. 9, and Fig. 11 represents a diagram showing the flexible connection made by said joints between the horizontal pipes of two adjacent cars.

Similar characters designate like parts throughout the several figures of the drawings.

In the drawings, 10 and 11 represent the train pipes of two adjacent cars which it is desired to connect in series either for the purpose of passing air through the same to the air brake or steam for the purpose of heating. The connection between the two pipes is usually made by a separable coupling 12 of any well-known form. One portion of the coupling 12 is connected by means of a system of piping 13 to the train pipe 10 while the other portion thereof is connected by means of a system of piping 14 to the train pipe 11.

It is obvious that it is desirable that the systems of piping 13—14 should have the greatest flexibility to take care of the various vibrations of the cars and changes in positions relative to each other and in order to accomplish this each system of piping 13—14 is provided with a double joint 15 and a single joint 16. The joint 16 consists of a head 17 provided with a neck 18 having a suitable thread 19 by which it may be connected to a train pipe 10 or 11 in any well known manner.

A passage 20 extends through the neck 18 and through the annular boss 21 projecting into the chamber 22 formed in the interior of the head 17. The boss 21 is made flaring as indicated at 23 and its extreme inner face is concaved as at 24 to form a seat for the outer face of the ball-shaped end 25 of a pipe member 26, the opposite end of which is threaded as at 27 to provide a means for connecting said pipe member to the pipe member 28 of the double joint 15. The head 17 has threaded thereto a cap 29 provided with a concaved seat 30 for said ball-shaped end 25, the opening through said cap being such as to permit a movement of said pipe member 26 about the axis of said ball end 25 into an inclined position as shown at 31 in Fig. 9.

Within the chamber 22 is mounted a gasket 32 surrounding said ball end and bearing against said gasket 32 is a metal washer 33 which is held in position against said gasket by means of the spring 34 surrounding said annular boss 21. A passage 35 extends through the pipe member 26 and communicates with the passage 20 through the neck of the head 17. The gasket 32 surrounding the ball-shaped end 25 of the pipe member 26 forms a tight joint preventing the leakage of any air or steam which may escape into the chamber 22. The seats 24—30 are ground to fit the curvature of said ball end 25 and prevent the passage of steam or air between the same. By adjusting the cap 29 it is obvious that any wear of joints may be cared for.

The pipe member 28 is provided with a flaring or ball-shaped end 36 which extends into a tubular casing 37, the opposite end of which is provided with another ball-shaped or flaring end 39 formed on the inner end of a pipe member 40. Either end of the casing 37 has threaded thereto a cap member 41 provided with a ground seat 42 concaved to fit the exterior surface of said ball or flaring end 36 or 39. The cap 41 is provided with a plurality of ribs 43 by which said cap may be adjusted in any desired position to take up the wear and is secured in adjusted position by means of the set screw 44. The openings through the caps 41 are such as to permit the movement of the pipe members 28 and 40 into the angular positions such as shown in Fig. 2.

Interposed between the inner faces of the ball-shaped ends 36 is a tubular connector formed in two parts 45 and 46 the outer ends of which are provided with flaring bell-shaped ends having ground faces 47 adapted to engage and form a tight joint with the inner face of the ball-shaped ends 36—39. The adjacent ends of the tubular members 45—46 are telescopically connected as shown at 48 so that they may be moved from each other to adjust the length of said connector in order to force the faces 47 firmly to a seat on the inner face of said ball-shaped ends. These flaring ends 47 are forced to their seats by means of a spring 49 surrounding said tubular members and bearing against the annular flanges 50 formed on each of said tubular members 45—46.

The outer ends of the caps 41 are provided with pockets in which is mounted a washer 51 of felt or similar material to prevent the dust from getting into the joints.

A passage 52 extends through the pipe member 28 and its ball-shaped end 36 and communicates with the passage 53 extending through the tubular connectors 45—46 the opposite end of said passage communicating with a passage 54 extending through the pipe member 40.

These joints as shown and described provide means for securing great flexibility in metal connections between the train pipe of adjacent cars and are so constructed that the wear may be readily taken up in the joints to prevent leakage while other means are provided which automatically hold the various members to their seats and assist in this object.

Any usual connections such as shown at 55 and 56 may be used to connect the pipe members 26 and 28 and the necks 18 and the train pipes 10—11 while the pipe members 40 and the coupling members 12 may be united in any well known manner. It is obvious also that if desired the pipe members 26 and 28 may be formed in one piece.

While the improved joints are shown as applied to the train pipes of cars to make connections between the same, it is obvious that they are adapted equally as well for many other purposes and the invention is not limited to the particular use shown and described herein.

It is believed that from the foregoing the operation of the invention will be readily understood.

Claims.

1. In a flexible pipe joint, the combination of a casing, pipe members each provided with a flaring end extending within said casing and having a concentric seat on its inner face, a cap secured to either end of said casing provided with a seat for one of said flaring ends, an imperforate tubular connector interposed between and extending from one to the other of said flaring ends and terminating at each end in an annular bearing surface seated upon said concentric seat, and means for forcing each of said flaring ends to its seat.

2. In a flexible pipe joint, the combination of a casing, pipe members each provided with a ball-shaped end located partially within said casing and having a concentric seat on its inner face, a cap secured to either end of said casing provided with a seat for a ball-shaped end, a divided imperforate tubular connector interposed between and extending from one to the other of said ball-shaped ends and terminating at each end in an annular bearing surface seated upon said concentric seat, and means for forcing the outer ends of said divided connector against the interior face of said ball-shaped ends.

3. In a flexible pipe joint, the combination of a casing, pipe members each provided with a ball-shaped end located partially within said casing and having a concentric seat on its inner face, a cap secured to either end of said casing provided with a seat for a ball-shaped end, a telescopic tubular connector interposed between said ball-shaped ends and terminating at each end in an annular bearing surface seated upon said concentric seat, and means for forcing the ends of said telescopic connector against the interior surface of said ends.

4. In a flexible pipe joint, the combination of a casing, pipe members each provided with a ball-shaped end located partially within said casing and having a concentric seat on its inner face, a cap secured to either end of said casing provided with a seat for a ball-shaped end, a telescopic tubular connector each end of which is provided with a flaring mouth and an annular seat fitting the interior face of said ball-shaped ends, and means for forcing the ends of said telescopic connector against the interior surface of said ends.

5. In a flexible pipe joint, the combination of a casing, pipe members each provided with a ball-shaped end located partially within said casing and having a concentric seat on its inner face, a cap secured to either end of said casing provided with a seat for a ball-shaped end, two tubular members telescopically connected together each provided with an annular flange, and a spring interposed between said flanges and adapted by pressure upon said flanges, to move said tubular members outwardly.

6. In a flexible pipe joint, the combination of a tubular casing, pipe members each provided with a ball-shaped end located partially within said casing and having a concentric seat on its inner face, a cap secured to either end of said casing provided with a seat for a ball-shaped end, two tubular members each provided with an annular flaring end fitting the interior of said ball-shaped end and an annular radial flange and having the inner end of one member reduced to slidably fit an enlarged portion of the bore of the other, and a spring interposed between said annular flanges and adapted by pressure upon said flanges to move said tubular members outwardly.

7. In a flexible pipe joint, the combination of a tubular casing, pipe members each provided with a ball-shaped end located partially within said casing and having a concentric seat on its inner face, a cap secured to either end of said casing provided with a seat for a ball-shaped end, two tubular imperforate members each provided at one end with an annular flaring end fitting the interior of said ball-shaped end and at the other with portions slidably forming an extensible tubular connection extending from one ball end to the other, and means for separating said tubular members to cause the flaring ends to firmly bear upon the interior face of said ball ends.

8. In a flexible pipe joint, the combination of a tubular casing, pipe members each provided with a ball-shaped end located partially within said casing and having a concentric seat on its inner face, a cap secured to either end of said casing provided with a seat for a ball-shaped end, two tubular imperforate members slidably connected together with their bores coincident and each provided with a flaring end fitted to the interior of a ball-shaped end, and means for forcing said members apart to cause each of their flaring ends to firmly bear upon the interior face of a ball-shaped end.

9. In a flexible pipe joint, the combination of a casing, pipe members each provided with a flaring concavo-convex end located partially within said casing and having a concentric seat on its inner face, a cap secured to either end of said casing provided with a seat for the convex face of said flaring end, a divided imperforate tubular connector interposed between said flaring ends and provided at either end with a convex bearing surface having a seat on the concaved face of said flaring end, and means for forcing said divided connector apart to seat its outer ends on said flaring ends and the latter upon their seats on the adjustable caps.

10. In a flexible pipe joint, the combination of a casing, pipe members each provided with a flaring concavo-convex end located partially within said casing and having a concentric seat on its inner face, a cap on either end of said casing provided with a seat for the convex face of said flaring end, a tubular connector interposed between said flaring ends provided at either end with a flaring mouth terminating in a spherical bearing surface adapted to seat upon the concaved face of one of said flaring ends of the pipe members, and means for retaining said connector, flaring ends and cap in contact to prevent leakage along either face of said flaring ends.

11. In a flexible pipe joint, the combination of a casing, pipe members each provided with an end within said casing having outer and inner concentric continuous faces, a cap secured to either end of said casing provided with a seat for each of the outer concentric faces, a divided tubular connector interposed between said ends and terminating at either end in an annular spherical surface adapted to seat upon the inner face of said pipe members at various angles, and means for forcing said annular seating surfaces to their seats upon said inner concentric faces.

12. In a flexible pipe joint, the combination of a casing, pipe members each provided with an end within said casing having outer and inner concentric continuous faces, a cap secured to each end of said casing provided with a seat for each of the outer concentric faces, a divided tubular connector interposed between said ends the walls of which at each end flare outward and terminate in annular semi-spherical faces surrounding the mouths of the tubular member and adapted to fit and find a seat upon the inner concentric faces of said pipe members, and means for forcing said annular semi-spherical faces to seats on said inner faces of said pipe members and the outer faces of said pipe members to their seats on the caps to said casing.

Signed by me at Boston, Massachusetts, this 27th day of March, 1906.

ARTHUR L. GREENLAW.

Witnesses:
  EDNA C. CLEVELAND,
  WALTER E. LOMBARD.